United States Patent
Kim

(10) Patent No.: US 7,340,762 B2
(45) Date of Patent: Mar. 4, 2008

(54) METHOD AND APPARATUS FOR BROADCASTING, VIEWING, RESERVING AND/OR DELAYED VIEWING OF DIGITAL TELEVISION PROGRAMS

(75) Inventor: Yeong-Taeg Kim, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 790 days.

(21) Appl. No.: 09/810,365

(22) Filed: Mar. 16, 2001

(65) Prior Publication Data

US 2002/0092032 A1 Jul. 11, 2002

Related U.S. Application Data

(60) Provisional application No. 60/189,786, filed on Mar. 16, 2000.

(51) Int. Cl.
H04N 5/455 (2006.01)
H04N 7/16 (2006.01)

(52) U.S. Cl. .................. 725/58; 725/61; 725/133; 725/141; 725/151

(58) Field of Classification Search ............ 725/58, 725/61, 89, 133–134, 141–142, 151–153; 715/105, 500.1, 721
See application file for complete search history.

(56) References Cited

U.S. PATENT DOCUMENTS 5,432,558 A * 7/1995 Kim ..................... 348/460
5,585,838 A * 12/1996 Lawler et al. ............. 725/54
6,344,878 B1 * 2/2002 Emura ..................... 348/460
6,505,348 B1 * 1/2003 Knowles et al. ........... 725/49
6,522,342 B1 * 2/2003 Gagnon et al. ........... 715/716
6,523,176 B1 * 2/2003 Yamane et al. ............ 725/58
6,642,939 B1 * 11/2003 Vallone et al. ........... 715/721
6,757,906 B1 * 6/2004 Look et al. ............... 725/45
6,934,963 B1 * 8/2005 Reynolds et al. .......... 725/39

* cited by examiner

*Primary Examiner*—Kieu-Oanh Bui
(74) *Attorney, Agent, or Firm*—Kenneth L. Sherman, Esq.; Michael Zarrabian, Esq.; Myers Dawes Andras & Sherman, LLP

(57) ABSTRACT

Methods and apparatus are provided for a digital television service where a Preview Program is transmitted along with associated Broadcast Scheduling Information (BSI) so that a viewer can easily reserve an associated Main Program for later viewing and/or recording. Different formats are provided for coding an MPEG-2 digital television signal which incorporate the Preview Program along with the associated Broadcast Scheduling Information (BSI) for the associated Main Program. Different functional architectures for Associated Digital Television Receivers (ADTVR) are also described which allow viewers to reserve the Main Programs for later viewing and/or recording. In the preferred embodiments, an RSVP Icon is simultaneously displayed with the Preview Program to inform the viewer that they may utilize the service of the preferred embodiments to easily reserve a related Main Program for later viewing and/or recording. The preferred Associated Digital Television Receivers (ADTVR) either (i) download an RSVP Icon within the MPEG-2 signal transmitted by the broadcaster, or (ii) generate its own RSVP Icon for display.

20 Claims, 4 Drawing Sheets

Third Functional Block Diagram of the ADTVR

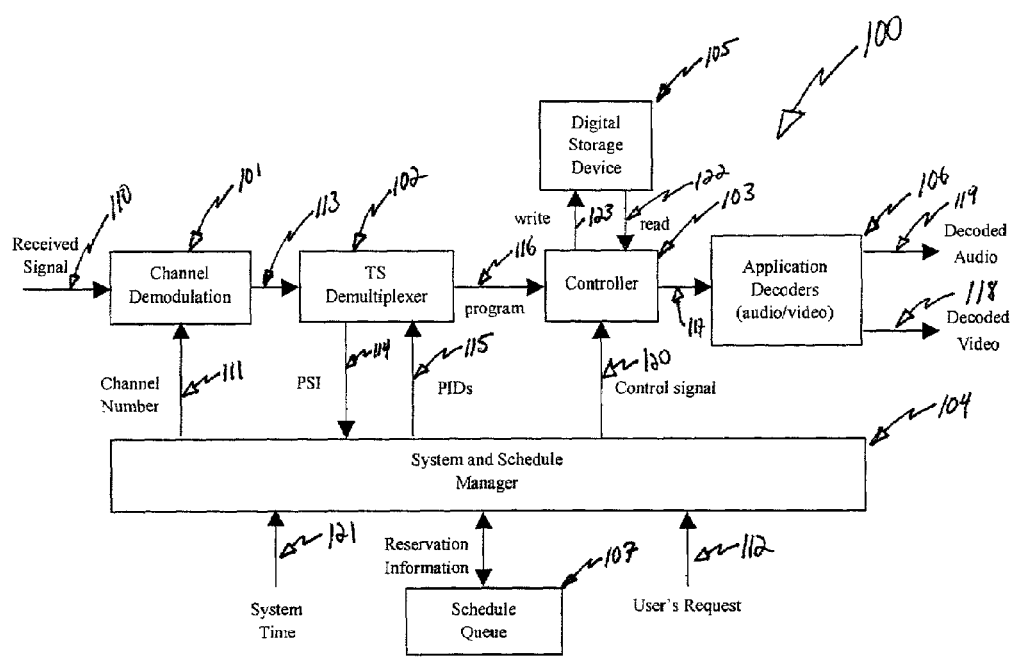
Figure 1. First Functional Block Diagram of the ADTVR.

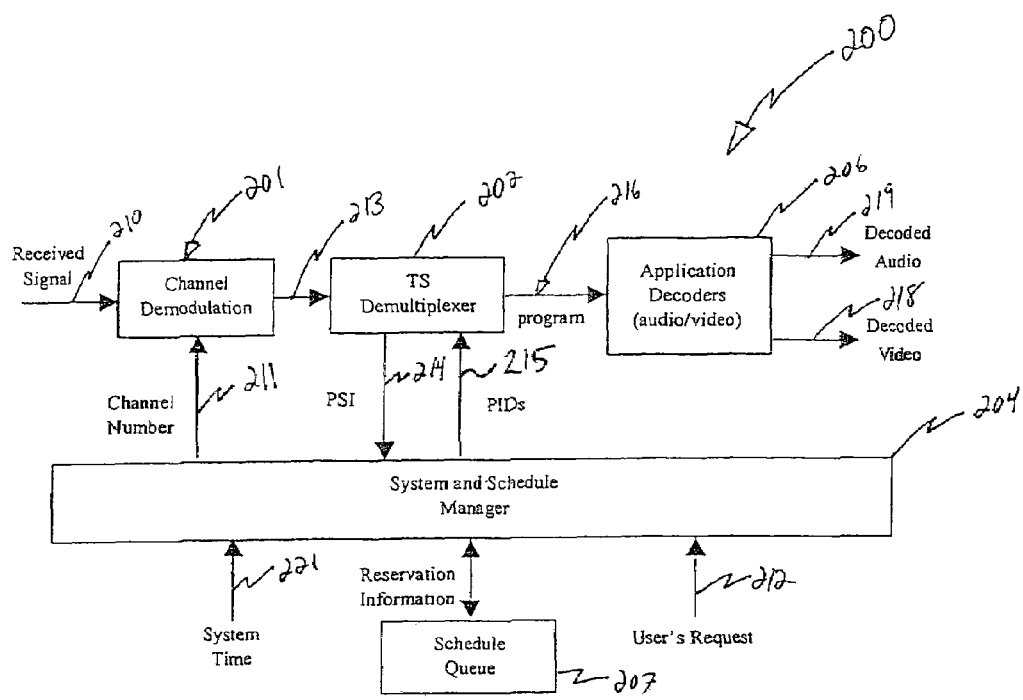
Figure 2. A Second Functional Block Diagram of the ADTVR.

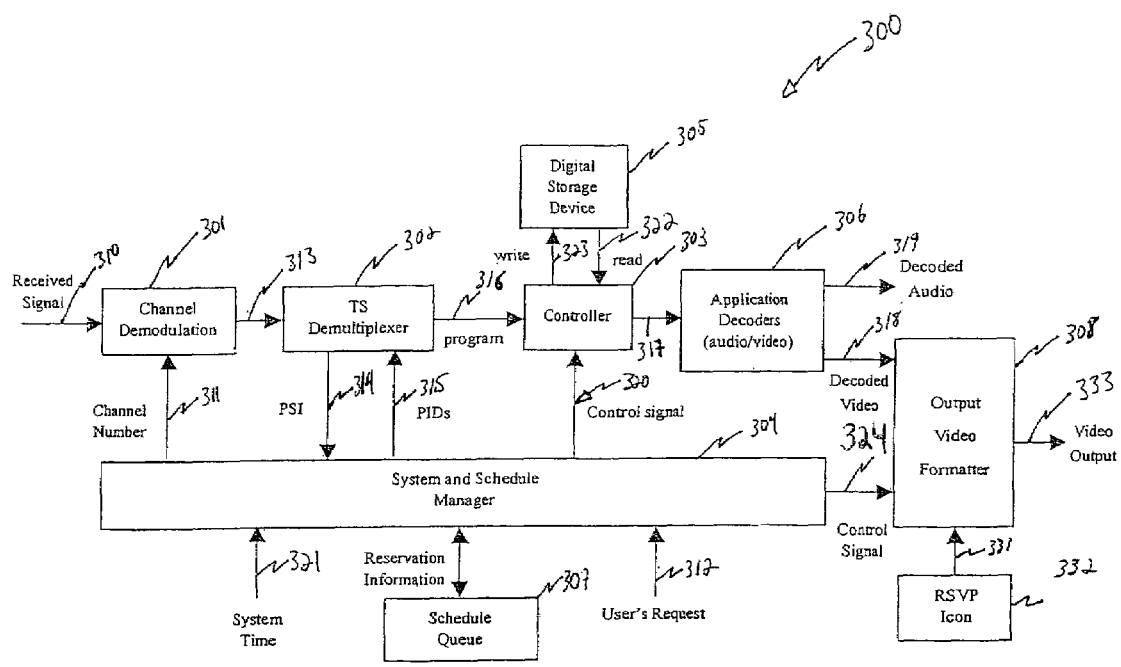
Figure 3. Third Functional Block Diagram of the ADTVR.

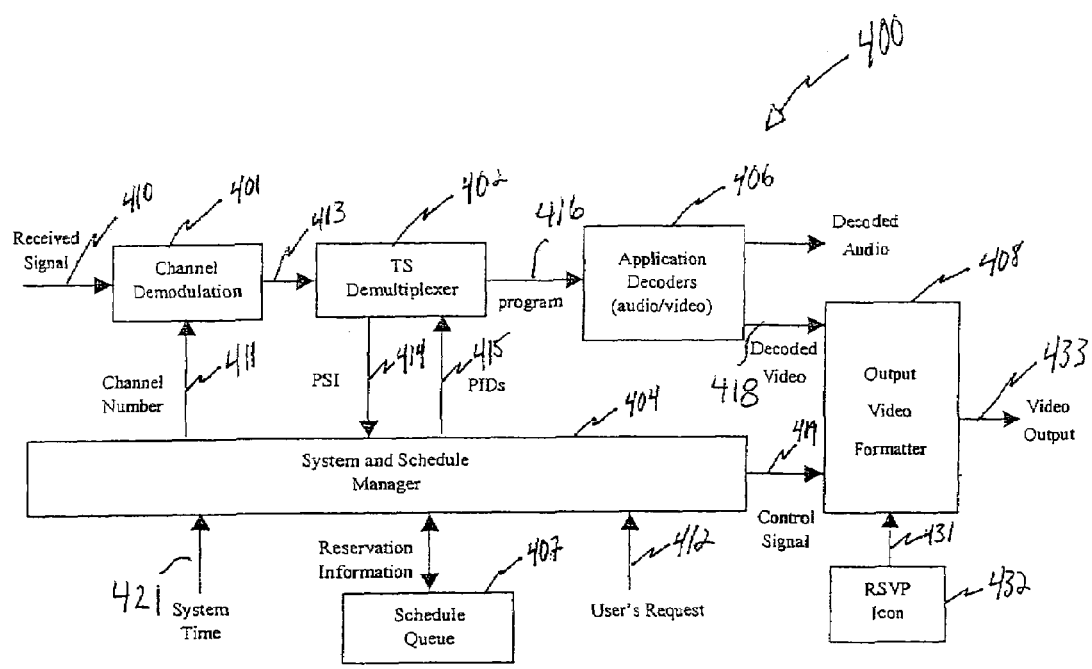
Figure 4. Fourth Functional Block Diagram of the ADTVR.

METHOD AND APPARATUS FOR BROADCASTING, VIEWING, RESERVING AND/OR DELAYED VIEWING OF DIGITAL TELEVISION PROGRAMS

CROSS-REFERENCES TO RELATED APPLICATIONS

Applicant claims the benefit of the U.S. Provisional Application No. 60/189,786 entitled "Methods And Apparatus for RSVP Service for the Digital TV Networks," filed Mar. 16, 2000, which application is incorporated herein by reference.

FIELD OF THE INVENTION

This invention relates to digital television networks and receivers, and more particularly, to a method and apparatus for providing digital television programming to viewers and allowing those viewer to pre-select associated Main Programs for future recording and/or future viewing from a Preview Program simultaneously broadcast with Broadcasting Schedule Information (BSI).

BACKGROUND OF THE INVENTION

Digital television broadcasts are well known in the art. Common digital video service networks which provide digital television broadcasts to viewers include digital cable TV, digital satellite TV, video-on-demand, and terrestrial digital TV broadcasting systems. In each of these services a service operator broadcasts information to a multitude of end users, or viewers, in the form of digital television signals provided over a transmission channel.

Digital television signals are generally broadcast in the MPEG-2 format. MPEG-2 is a well known standard which was adopted on Nov. 4, 1994 by the ISO (International Organization for Standards) Motion Picture Experts Group (MPEG) for audio/video digital signal compression, configuration and transmission. The MPEG-2 Standard allows for consistent and uniform digital video signal sampling, coding, transmission and reception throughout the world and is very well known in the art.

Through the known systems designed according to the MPEG-2 Standard (which is also known as International Standard ISO/IEC 13818-1), the packetizing, multiplexing, and sending of coded bit streams of multiple programs may be accomplished. Using this standard signal configuration, multiple programs, along with audio and video overlays may be transmitted by a service operator and received by an end user over a specific transmission channel. Details of MPEG-2 Systems can be also found in the textbook, Digital Video: An Introduction to MPEG-2, Barry G. Haskell and et. al., Champman and Hall, New York, N.Y., USA, 1997.

Since the adoption of the MPEG-2 Standard, service networks have proliferated around the world which networks provide digital television programming to end users. Each of these digital television broadcast services provide an MPEG-2 signal to end users over the transmission channel discussed above.

Within the broadcast MPEG-2 signal there are a multitude of modulated channels and also a multitude of Programs. Generally, the viewer tunes to, or selects, a channel for viewing and watches the Program being broadcast within that channel. The viewer selects that channel from pre-published hard copy guides distributed throughout the broadcast region.

Guides are also transmitted over within the broadcast MPEG-2 signal. Those broadcast guides may have a channel designation or they may be an overlaid system guide which the viewer can download from the digital television service network. These guides generally show the program title, the program time, and perhaps a short "blurb" regarding the programs within the guide. However, oftentimes there is no "blurb" or the pre-written "blurb" is insufficient for the viewer to determine if the program is desirable.

Furthermore, the information is generally written by the broadcaster which prevents the program producer from actively marketing their program or movie to the viewer in the most desirable manner possible. It should be noted that the producer's revenues are generally based upon the amount of views or viewers who watch the program.

In some digital television broadcast networks, there is a channel dedicated to trailers for upcoming or currently broadcasting programs which allow the viewer to watch the trailers created by the producer. However, if the viewer wants to watch one of those programs, the viewer must then change to the guide and select the times and other information for the program.

Currently, within the digital networks on the market today, if the viewer desires to watch a program, they can select it from the guide for display or reserve it for future display. When they later watch the program, they may realize that they had reserved the wrong program. None of the systems currently known, allow the viewer to actually understand which Program they are selecting for future viewing, when they are selecting the program, until they watch the program later.

OBJECTS OF THE INVENTION

Therefore, it is an object of the present invention to provide methods and apparatus for digital television which allow users to watch trailers or Preview Programs and directly select the associated Main Program for future viewing or recording.

It is yet another object of the present invention to provide methods and apparatus for digital television broadcasters to transmit programming information in a prepackaged format for viewers to understand and select the programs for viewing.

It is yet still another object of the present invention to provide methods and apparatus for producers to market their programs in conjunction with digital television broadcast schedule information.

These, together with other objects of the present invention, along with the various features of novelty which characterize the present invention, are pointed out with particularity in the claims annexed to and forming a part of this disclosure.

SUMMARY OF THE INVENTION

The above and other objects are achieved by the present invention, which provides methods and apparatus for a digital television service where a Preview Program is transmitted along with associated Broadcast Scheduling Information (BSI) so that a viewer can easily reserve an associated Main Program for later viewing and/or recording.

In the preferred embodiments of the invention, different formats are provided for coding an MPEG-2 digital television signal which incorporate the Preview Program along with the associated Broadcast Scheduling Information (BSI) for the associated Main Program.

The preferred embodiments of the invention also set forth different functional architectures for Associated Digital Television Receivers (ADTVR) which allow viewers to use the system of the preferred embodiments of the invention to reserve the Main Programs for later viewing and/or recording. If while a viewer is watching a Preview Program, the interested viewer reserves the associated Main Program for later viewing or recording, the Associated Digital Television Receiver (ADTVR) saves the associated Broadcasting Schedule Information (BSI) of that associated Main Program to a Schedule Queue within the Associated Digital Television Receiver (ADTVR). Then, when the scheduled broadcasting time of the reserved Main Program occurs, the Associated Digital Television Receiver (ADTVR) tunes to the channel for the reserved Main Program, and delivers the program to the decoders, or, saves the program into a digital storage device for later viewing.

In these preferred embodiments, an RSVP Icon is simultaneously displayed with the Preview Program to inform the viewer that they may utilize the service of the preferred embodiments to easily reserve a related Main Program for later viewing and/or recording. The preferred Associated Digital Television Receivers (ADTVR) either (i) download an RSVP Icon within the MPEG-2 signal transmitted by the broadcaster, or (ii) generate its own RSVP Icon for display.

It should be noted that the principals of the present invention should not be limited to the embodiments discussed within this specification. For instance, principals of the present invention can also be applied as an embodiment to any digital television broadcasting system where a Preview Program is sent with information allowing the viewer to select and order a related item while the Preview Program is displaying without departing from the spirit and scope of the present invention.

Thus, the principals of the present invention also includes any method of displaying an MPEG-2 digital television signal which comprises the steps of: displaying a Preview Program coded within an MPEG-2 signal, the Preview Program relating to a related item of choice for a viewer; and receiving ordering information embedded within the MPEG-2 signal simultaneously with the display of the program, the ordering information relating to the item of choice, and the ordering information allowing a viewer to select the item while the program is being displayed.

This embodied method, may also further comprise the step of providing a notice to a viewer, the notice being applied to the viewer in such a manner as to inform the viewer that they are receiving an MPEG-2 signal which includes both the program and the ordering information. Here the notice is an icon simultaneously displayed with the program. In the preferred embodiments discussed herein, the item of Choice is an associated Main Program and the ordering information is Broadcasting Schedule Information.

BRIEF DESCRIPTION OF THE DRAWINGS

The foregoing and other objects, advantages and features of the invention, and the manner in which the same are accomplished, will become more readily apparent upon consideration of the following detailed description of the preferred embodiment of the present invention taken in conjunction with the accompanying drawings which illustrate preferred and exemplary embodiments, and wherein:

FIG. 1 shows a first functional architecture of an Associated Digital Television Receiver (ADTVR) constructed in accordance with a first preferred embodiment of the present invention.

FIG. 2 shows a second functional architecture of an Associated Digital Television Receiver (ADTVR) constructed in accordance with a second preferred embodiment of the present invention.

FIG. 3 shows a third functional architecture of an Associated Digital Television Receiver (ADTVR) constructed in accordance with a third preferred embodiment of the present invention.

FIG. 4 shows a fourth functional architecture of an Associated Digital Television Receiver (ADTVR) constructed in accordance with a fourth preferred embodiment of the present invention.

DETAILED DESCRIPTION OF THE PREFERRED EMBODIMENT

The following description is provided to enable any person skilled in the art to make and use the invention and sets forth the best modes presently contemplated by the inventors for carrying out this invention. Various modifications however, will remain readily apparent to those skilled in the art, since the generic principles of the present invention have been completely defined.

The present invention provides methods and apparatus for receiving and processing digital television signals which allow a viewer to pre-select digital television programs for future viewing and/or recording. By way of example, the preferred embodiments of the present invention describe various programming techniques within a broadcast MPEG-2 digital television signal which allows a viewer to pre-select programs that they wish to view and/or record in the future. This detailed description of the preferred embodiment first explains methods and structures for a broadcast MPEG-2 digital television signal, and then describes digital television receiver functional architectures which process this broadcast digital television signal in a manner in conjunction with the preferred embodiment of the present invention.

As discussed above the preferred embodiment of the present invention describes methods and apparatus for reserving and viewing or recording a Main Program which is to be broadcast in the future while a Preview Program relating to that Main Program is broadcasting over a digital television broadcast network. The following detailed description of the preferred embodiment uses the terminology from the MPEG-2, ISO/IEC 13818-1 Standard, which is commonly known in the art.

In the preferred embodiment of the present invention, a digital television broadcaster transmits a Preview Program over a digital television network together with Broadcasting Schedule Information (BSI) for a Main Program associated with that Preview Program. The Broadcasting Schedule Information (BSI) may include, but is not limited to, a channel number describing the channel which will carry the Main Program, a program number relating to the Main Program, a start time of the Main Program, and a running time for the Main Program.

The viewer subscribing to the broadcaster's digital television network will possess a digital television receiver for the system of the present invention, herein referred to as an Associated Digital Television Receiver (ADTVR), which is constructed according to the principals of the preferred embodiment of the present invention. The Associated Digital Television Receiver (ADTVR) receives the Preview Program along with the Broadcasting Schedule Information (BSI) for the Main Program from the broadcaster over a transmission channel.

In one preferred embodiment of the present invention discussed below, the Associated Digital Television Receiver (ADTVR) provides an icon to the viewer's display, which icon indicates to the viewer that the Main Program related to the current Preview Program can be reserved for viewing or recording. The icon appears on the display along with decoded video content of the Preview Program.

If an interested viewer desires to reserve the Main Program for viewing or recording by the Associated Digital Television Receiver (ADTVR), the viewer instructs the Associated Digital Television Receiver (ADTVR) to store the Broadcasting Schedule Information (BSI) of the Main Program. Then, at the scheduled broadcasting time for the reserved Main Program, the Associated Digital Television Receiver (ADTVR) tunes to the channel of the reserved Main Program, and starts to decode the reserved Main Program, or alternatively, saves the program into a digital storage device within the Associated Digital Television Receiver (ADTVR), depending on the viewer's instructions. In summary, the preferred embodiment of the present invention provides the ability to reserve a Main Program for viewing or recording while the viewer is viewing the related Preview Program transmitted over the Digital Television network.

The system of the preferred embodiment of the present invention is herein often referred to as the RSVP Service for convenience. The specific details of programming and operation of the preferred embodiment the present invention follows next.

An essential prerequisite of the RSVP Service of the preferred embodiment of the present invention is that the Broadcasting Schedule Information (BSI) of the Main Program is transmitted by the broadcaster over the transmission channel, and thereby delivered to the Associated Digital Television Receiver (ADTVR), simultaneously with the Preview Program. Thus, when a Preview Program is being broadcast over the digital television network, coded bit-streams containing the Broadcasting Schedule Information (BSI) of the Main Program is broadcast along with the Preview Program.

Different methodologies for transmitting the Broadcasting Schedule Information (BSI) of the Main Program along with its Preview Program are provided for in the preferred embodiments of the present invention by expanding the Program Specific Information (PSI) of the MPEG-2 Systems. In one preferred embodiment of the present invention, the transmission of the Broadcasting Schedule Information (BSI) stream of the Main Program is placed within the program_descriptors( ) of the Transport Stream Program Map Table (TS-PMT) of the MPEG-2 signal.

The specific syntax of the Transport Stream Program Map Table (TS-PMT) can be found in the ISO/IEC 13818-1 Standard and is commonly known in the art. Hence, in this preferred embodiment of the present invention a descriptor is created which will be called a "program_reserve_descriptor," whose core syntax is composed of the channel number, the program number, the start time, the length of program, and etc., for the associated Main Program. The "program_reserve_descriptor," is illustrated in Table 1.

TABLE 1

| program_reserve_descriptor( ): Core Syntax |
|---|
| Program_reserve_descriptor ( ){<br>    descriptor_tag<br>        descriptor_length<br>        channel_number<br>        main_program_number<br>        start_time<br>        length_in_seconds<br>} |

As shown in Table 1, the descriptor descriptor_tag identifies that this particular descriptor is the program_reserve_descriptor for the RSVP service of the preferred embodiment of the present invention. In fact, there are many different descriptors defined within the syntax of the MPEG-2 signal format, where each descriptor has different value for descriptor_tag. Depending on the system specification of the transmitted digital television network signal, a value between 0 to 255 can be assigned for the value of descriptor_tag identifying the program_reserve_descriptor of the preferred embodiment of the present invention unless it conflicts with another descriptors designation which has already been defined.

In Table 1, the descriptor descriptor_length represents the number of bytes following. The descriptor channel_number represents the channel in which the Main Program will be broadcast. In this preferred embodiment of the present invention, this channel_number descriptor may only represent the physical channel number or it may represent the physical channel number along with the virtual channel number. The descriptor main_program_number shown in Table 1 represents the program number of the Main Program. The start_time descriptor represents the start time of the Main Program, and the length_in_seconds represents the length or the running time of the Main Program. Depending on necessity, miscellaneous other information describing the Main Program can also be added to the program_reserve_descriptor descriptor in the syntax for the transmitted MPEG-2 signal.

In a further preferred embodiment created according to the principals of the present invention, the order of the syntax shown in Table 1 can be changed to the format shown in Table 2. Here each of the descriptors designates the same information as indicated in the descriptor shown in Table 1; their order is merely being changed.

TABLE 2

| program_reserve_descriptor( ): Secondary Syntax Order |
|---|
| Program_reserve_descriptor ( ){<br>    descriptor_tag<br>        descriptor_length<br>        start_time<br>        channel_number<br>        length_in_seconds<br>        main_program_number<br>} |

A further program_reserve_descriptor descriptor structure which may be used within the preferred embodiment of the present invention is shown below in Table 3. In the program_reserve_descriptor descriptor shown in Table 3, an end_time descriptor replaces the length_in_seconds descriptor shown in the program_reserve_descriptor descriptor depicted in Table 1. The end_time descriptor contains coding which represents the ending time of the Main Program.

TABLE 3

| program_reserve_descriptor( ): An alternative syntax. |
|---|
| Program_reserve_descriptor ( ){<br>    descriptor_tag<br>        descriptor_length<br>        channel_number<br>        main_program_number<br>        start_time<br>        end_time<br>} |

The preferred embodiment of the present invention should not be limited to the order of the descriptors, or even their definitions or content. As shown in Tables 1, 2 and 3, the syntax of the program_reserve_descriptor descriptor can be varied significantly and still operate to provide Broadcasting Schedule Information (BSI) for the Main Program which allows the Associated Digital Television Receiver (ADTVR) to download coding information to control the future recording and/or viewing of the Main Program. Furthermore, the core information of the Broadcasting Schedule Information (BSI) (channel number, program number, start time, running time, end time) for the Main Program can also be embedded in other descriptors within the MPEG-2 signal syntax, such as the video_descriptor descriptor, depending on the specific system design of the particular digital television network.

When the Associated Digital Television Receiver (ADTVR) of the preferred embodiments of the invention receives the Preview Program along with the program_reserve_descriptor descriptor of its associated Main Program, an icon is simultaneously displayed with the output video while the decoded video content of the Preview Program is also displaying. The icon informs the viewer that they can input an instruction into the Associated Digital Television Receiver (ADTVR) to make a reservation for viewing or for recording the Main Program associated with the Preview Program, or, the icon may simply represent that the RSVP Service capability of the preferred embodiment of the present invention is being used by the digital television broadcaster and that a MPEG-2 digital television signal is being provided which conforms to the principals of the preferred embodiment of the present invention.

In the preferred embodiments of the present invention, the icon may be embedded within the MPEG-2 digital video signal transmitted by the broadcaster of a Preview Program, or the icon may be generated by the Associated Digital Television Receiver (ADTVR) constructed in accordance with the principals described herein. Within this Detailed Description, this simultaneously displayed icon will also be referred to as the RSVP icon.

When the viewer is watching the Preview Program being broadcast simultaneously with Broadcasting Schedule Information (BSI), in accordance with the preferred embodiment of the present invention, the viewer may desire to reserve the associated Main Program for either viewing or recording. Based upon this decision, if the interested viewer inputs an instruction into the Associated Digital Television Receiver (ADTVR) to request the Associated Digital Television Receiver (ADTVR) to reserve the associated Main Program for viewing or recording, the Associated Digital Television Receiver (ADTVR) stores and manages the Broadcasting Schedule Information (BSI) of the associated Main Program within in a Schedule Queue.

Once Broadcasting Schedule Information (BSI) of the associated Main Program is downloaded into the Schedule Queue, the Associated Digital Television Receiver (ADTVR) keeps comparing the start time for the associated Main Program, defined within the start_time descriptor, with a clock outputting the current time. When the scheduled broadcasting time of the associated Main Program occurs, the Schedule Queue instructs a System and Schedule Manager (SSM) of the Associated Digital Television Receiver (ADTVR) to control the system to get the bitstreams of the reserved associated Main Program.

This control by the System and Schedule Manager (SSM) may include a channel change if necessary, and a parsing of the Program Specific Information (PSI) from the MPEG-2 signal being received from the channel to get the associated bitstreams of the specific reserved associated Main Program. Once the bitstreams of the Main Program are recovered from the overall MPEG-2 signal, those bitstreams of the reserved Main Program is delivered to the application decoders of the Associated Digital Television Receiver (ADTVR) for instant viewing, or alternatively, those bitstreams may be saved in a digital storage device for later viewing depending on the viewer's request, i.e., view or record.

FIG. 1 shows a first functional architecture of an Associated Digital Television Receiver (ADTVR) 100 constructed in accordance with a first preferred embodiment of the present invention. The Associated Digital Television Receiver (ADTVR) 100 is primarily applicable where the RSVP Service icon is embedded within the MPEG-2 video signal of a Preview Program transmitted by the broadcaster. As shown in FIG. 1, the Associated Digital Television Receiver (ADTVR) 100 includes a Channel Demodulator 101, a Transport Stream (TS) Demultiplexer 102, a Controller 103, a System and Schedule Manager (SSM) 104, a Digital Storage Device 105, Application Decoders 106, and a Schedule Queue 107.

Initially, within the Associated Digital Television Receiver (ADTVR) 100, the Channel Demodulator 101 receives the digital television signal transmitted over the transmission channel from the digital television broadcaster, and which digital television signal is provided at input 110. The Channel Demodulator 101 extracts the channel specific bitstreams from the received digital television signal.

The Channel Demodulator 101 is configured to demodulate the signal received at input 110 based upon a channel selection command 111 sent by System and Schedule Manager 104. This channel selection command 111 is chosen based upon the user's tuning choices and selections which are input at a User Interface 112. The Channel Demodulator 101 outputs the channel specific bitstreams 113 to the TS Demultiplexer 102.

The TS Demultiplexer 102 then demultiplexes those channel specific bitstreams 113, or TS packets, coming from the Channel Demodulator 101. When the channel specific bitstreams 113 are demultiplexed by the TS Demultiplexer 102, the System and Schedule Manager 104 obtains Program Specific Information (PSI) 114 for the chosen channel specific bitstreams 113. The Program Specific Information (PSI) is embedded within the TS packets 113 as tables. The System and Schedule Manager 104 delivers the Program Specific Information (PSI) 113 of the selected channel specific bitstreams 113 to the user at the User Interface 112, and receives the viewer's choices regarding program selection, request for viewing, recording, etc.

In response to the user's selections 112, the System and Schedule Manager 104 controls and manages the flow of the bitstreams regarding the selected programs in accordance with the user's requests and feeds packet identifications (PID) 115 to the TS Demultiplexers 102 to select the associated bitstreams of the programs that the user has selected.

By controlling the TS Demultiplexer 102, the System and Schedule Manager 104 obtains the Program Specific Information (PSI) 114 from the channel selected by the user 112, and which was previously input into the Channel Demodulator 101 at input 111. A specific description of the Program Specific Information (PSI) in an MPEG-2 digital television signal can be obtained from the International Standard ISO/IEC 13818-1, which is known in the art and incorporated herein by reference. International Standard ISO/IEC 13818-1 also includes an explanation of TS packetization, and reference should be made to the TS syntax defined therein.

Typical steps which may be used to get the Program Specific Information (PSI) from the Transport Stream Packets is to first find the Program Associated Table (PAT) which contains the program numbers and the Packet Identification (PID) of the associated Program Map Tables (PMT). Then, once the Program Map Tables (PMT) are obtained, the respective Packet Identifications (PID) of the elementary or packetized elementary bitstreams of the programs available in the channel can be obtained from the Program Map Tables (PMT), and utilized by the System and Schedule Manager 104, to process the bitstreams of the programs selected for viewing and/or processing.

In the first preferred embodiment of the present invention, the System and Schedule Manager 104 first obtains the Program Associated Table (PAT) of the selected channel from the TS Demultiplexer 102, which contains the program numbers and the Packet Identification (PID) of the associated Program Map Tables (PMT). Then from the Program Map Tables (PMT) the respective Packet Identification (PID) of the elementary or packetized elementary streams of the programs available in the channel can be attained.

In the first preferred embodiment of the present invention, if the System and Schedule Manager 104 detects that the current program which has been selected for viewing contains Broadcasting Schedule Information (BSI), i.e., meaning that it is a Preview Program capable of providing the RSVP Service, then the System and Schedule Manager 104 causes the RSVP icon to be sent for display simultaneously with the Preview Program. In the first preferred embodiment, the sends control signals 115, 120 to the TS Demultiplexer 102 and Controller 103, respectively, to cause the RSVP icon being carried within bitstreams output 113 by the Channel Demodulator 101, to be output 116 from the TS Demultiplexer 102, sent through the controller 103 to be output 117 to the Application Decoders 106 and then displayed within the decoded video output 118.

While the RSVP icon is displaying simultaneously with the Preview Program, the viewer can easily select the associated Main Program for future viewing and/or recording. If the viewer decides to select the associated Main Program, then the viewer inputs their instructions into the System and Schedule Manager 104 through a user interface 112.

Based upon those viewer instructions, the System and Schedule Manager 104 saves the Broadcasting Schedule Information (BSI) of the associated Main Program into the Schedule Queue 107. The System and Schedule Manager 104 downloads saves the Broadcasting Schedule Information (BSI) being carried within the Program Specific Information (PSI) 114 from the TS Demultiplexer 102 into the Schedule Queue 107. Once the Broadcasting Schedule Information (BSI) is stored in the Schedule Queue 107, the System and Schedule Manager 104 keeps comparing the program start time downloaded from the start_time descriptor with the System Time 121.

When the broadcasting schedule time occurs for a reserved Main Program whose Broadcasting Schedule Information (BSI) is stored in the Schedule Queue 107, the System and Schedule Manager 104 sends a new signal 111 to the Channel Demodulator 101 and thereby changes the channel number instruction 111 for the Channel Demodulator 101 to the channel number for the reserved Main Program as specified in the Broadcasting Schedule Information (BSI). The System and Schedule Manager 104 then instructs the TS Demultiplexer 102 to output 116 the bitstreams of the reserved Main Program whose program number is also stored within in the Broadcasting Schedule Information (BSI) in the Schedule Queue 107.

In the first preferred embodiment, all of the Broadcast Schedule Information (BSI) is stored in the Schedule Queue 107. However, other embodiments of the present invention are envisioned which would allow the Schedule Queue more efficiency in storage size and operation where the Schedule Queue would only store the start_time descriptor and a storage address for the remainder of the Broadcast Schedule Information (BSI), a separate storage device would hold the remaining Broadcast Schedule Information (BSI) and control instructions.

Once the bitstreams of the reserved Main Program are output 116 from the TS Demultiplexer 102, the System and Schedule Manager 104 checks to see if the viewer instructs the Associated Digital Television Receiver (ADTVR) 100 to display or record the reserved Main Program. If the viewer instructs the Associated Digital Television Receiver (ADTVR) to display the reserved Main Program, then the System and Schedule Manager 104 sends a control signal 120 to the Controller 103 so that the bitstream of the Main Program output 116 from the TS Demultiplexer 102 goes to the Application Decoders 106 for decoding and display output.

Alternatively, if either (a) the viewer instructs the Associated Digital Television Receiver (ADTVR) to record the reserved Main Program, or (b) the viewer fails to input an instruction to view the reserved Main Program within a predetermined period of time of the broadcast schedule time, then the System and Schedule Manager 104 sends a control signal 120 to the Controller 103 so that the bitstream of the Main Program output 116 from the TS Demultiplexer 102 is written to the Digital Storage Device 105. It should be notified that the Associated Digital Television Receiver (ADTVR) 100 of the preferred embodiment of the invention advises the viewer that the broadcast schedule time is occurring and they must input a viewing instruction to view if they do not want the Main Program to be recorded.

Once the Main Program either finishes recording or displaying, either because the information within the end_time descriptor matches the System Time 121 or the downloaded MPEG-2 signal for the Main Program signifies that the Main Program is completed, the System and Schedule Manager 104 deletes the Broadcasting Schedule Information (BSI) for the Main Program from the list within the Schedule Queue 107.

Thereafter, if the Main Program has been previously recorded, the viewer may decide to display the previously recorded Main Program. When the viewer inputs a request to play the saved program at the user interface 112, the System and Schedule Manager 104 of the first preferred Associated Digital Television Receiver (ADTVR) 100 instructs the Controller 103 to read 122 the saved bitstream of the Main Program from the Digital Storage Device 106 and delivers the Main Program bitstream along output 117 to the Application Decoders 106 for decoding and playing.

FIG. 2 shows a second functional architecture of an Associated Digital Television Receiver (ADTVR) 200 constructed in accordance with a second preferred embodiment of the present invention. This second Associated Digital Television Receiver (ADTVR) 200 is primarily applicable where the RSVP Service icon is embedded within the MPEG-2 video signal of a Preview Program transmitted by the broadcaster, and is the same as the first Associated Digital Television Receiver (ADTVR) 100 with the exception that it does not provide functionality for recording a Main Program for delayed viewing. This second Associated Digital Television Receiver (ADTVR) 200 only provides functionality for reserved viewing of a Main Program in conjunction with the system where the RSVP Service icon is embedded within the MPEG-2 video signal of a Preview Program transmitted by the broadcaster.

As shown in FIG. 2, the Associated Digital Television Receiver (ADTVR) 200 includes a Channel Demodulator 201, a Transport Stream (TS) Demultiplexer 202, a System and Schedule Manager (SSM) 204, Application Decoders 206, and a Schedule Queue 207.

Initially, within the Associated Digital Television Receiver (ADTVR) 200, the Channel Demodulator 202 receives the digital television signal transmitted over the transmission channel from the digital television broadcaster, and which digital television signal is provided at input 210. The Channel Demodulator 201 extracts the channel specific bitstreams from the received digital television signal.

The Channel Demodulator 201 is configured to demodulate the signal received at input 210 based upon a channel selection command 211 sent by System and Schedule Manager 204. This channel selection command 211 is chosen based upon the user's tuning choices and selections which are input at a User Interface 212. The Channel Demodulator 201 outputs the channel specific bitstreams 213 to the TS Demultiplexer 202.

The TS Demultiplexer 202 then demultiplexes those channel specific bitstreams 213, or TS packets, coming from the Channel Demodulator 201. When the channel specific bitstreams 213 are demultiplexed by the TS Demultiplexer 202, the System and Schedule Manager 204 obtains Program Specific Information (PSI) 214 for the chosen channel specific bitstreams 213. The Program Specific Information (PSI) 214 is embedded within the TS packets 213 as tables. The System and Schedule Manager 204 delivers the Program Specific Information (PSI) 214 of the selected channel specific bitstreams 213 to the user at the User Interface 212, and receives the viewer's choices regarding program selection, request for viewing, etc.

In response to the user's selections 212, the System and Schedule Manager 204 controls and manages the flow of the bitstreams regarding the selected programs in accordance with the user's requests and feeds packet identifications (PID) 215 to the TS Demultiplexer 202 to select the associated bitstreams of the programs that the user has selected.

By controlling the TS Demultiplexer 202, the System and Schedule Manager 204 obtains the Program Specific Information (PSI) 214 from the channel selected by the user 212, and which was previously input into the Channel Demodulator 201 at input 211. A specific description of the Program Specific Information (PSI) in an MPEG-2 digital television signal format can be obtained from the International Standard ISO/IEC 13818-1, which is known in the art and incorporated herein by reference. International Standard ISO/IEC 13818-1 also includes an explanation of TS packetization, and reference should be made to the TS syntax defined therein.

Typical steps which may be used to get the Program Specific Information (PSI) from the Transport Stream Packets is to first find the Program Associated Table (PAT) which contains the program numbers and the Packet Identification (PID) of the associated Program Map Tables (PMT). Then, once the Program Map Tables (PMT) are obtained, the respective Packet Identifications (PID) of the elementary or packetized elementary bitstreams of the programs available in the channel can be obtained from the Program Map Tables (PMT), and utilized by the System and Schedule Manager 204, to process the bitstreams of the programs selected for viewing and/or processing.

In the second preferred embodiment of the present invention, the System and Schedule Manager 204 first obtains the Program Associated Table (PAT) of the selected channel from the TS Demultiplexer 202, which contains the program numbers and the Packet Identification (PID) of the associated Program Map Tables (PMT). Then from the Program Map Tables (PMT) the respective Packet Identification (PID) of the elementary or packetized elementary streams of the programs available in the channel can be attained.

In the second preferred embodiment of the present invention, if the System and Schedule Manager 204 detects that the current program which has been selected for viewing contains Broadcasting Schedule Information (BSI), i.e., meaning that it is a Preview Program capable of providing the RSVP Service, then the System and Schedule Manager 204 causes the RSVP icon to be sent for display simultaneously with the Preview Program. In the second preferred embodiment, the System and Schedule Manager 204 sends control signals 214 to the TS Demultiplexer 202 to cause the RSVP icon being carried within bitstreams output 213 by the Channel Demodulator 201, to be output 216 from the TS Demultiplexer 202 to the Application Decoders 206 and then displayed within the decoded video output 218.

While the RSVP icon is displaying simultaneously with the Preview Program, the viewer can easily select the associated Main Program for future viewing. If the viewer decides to select the associated Main Program, then the viewer inputs their instructions into the System and Schedule Manager 204 through a user interface 212.

Based upon those viewer instructions, the System and Schedule Manager 204 saves the Broadcasting Schedule Information (BSI) of the associated Main Program into the Schedule Queue 207. The System and Schedule Manager 204 downloads the Broadcasting Schedule Information (BSI) being carried within the Program Specific Information (PSI) 214 from the TS Demultiplexer 202 into the Schedule Queue 207. Once the Broadcasting Schedule Information (BSI) is stored in the Schedule Queue 207, the System and Schedule Manager 204 keeps comparing the program start time, downloaded from the start_time descriptor, with the System Time 221.

When the broadcasting schedule time occurs for a reserved Main Program whose Broadcasting Schedule Information (BSI) is stored in the Schedule Queue 207, the System and Schedule Manager 204 sends a new signal 211 to the Channel Demodulator 201 and thereby changes the channel number instruction 211 for the Channel Demodulator 201 to the channel number for the reserved Main Program as specified in the Broadcasting Schedule Information (BSI). The System and Schedule Manager 204 then instructs the TS Demultiplexer 202 to output 216 the bitstreams of the reserved Main Program whose program number within the MPEG-2 digital television signal format is also stored within in the Broadcasting Schedule Information (BSI) in the Schedule Queue 207.

In the second preferred embodiment, all of the Broadcast Schedule Information (BSI) is stored in the Schedule Queue 207. However, other embodiments of the present invention are envisioned which would allow the Schedule Queue more efficiency in storage size and operation where the Schedule Queue would only store the start_time descriptor and a storage address for the remainder of the Broadcast Schedule Information (BSI), a separate storage device would hold the remaining Broadcast Schedule Information (BSI) and control instructions.

Once the bitstreams of the reserved Main Program are output 216 from the TS Demultiplexer 202, the bitstream of the Main Program output 216 from the TS Demultiplexer 202 goes to the Application Decoders 206 for decoding and display output.

Once the Main Program finishes displaying, either because the information within the end_time descriptor matches the System Time 221 or the downloaded MPEG-2 signal for the Main Program signifies that the Main Program is completed, the System and Schedule Manager 204 deletes the Broadcasting Schedule Information (BSI) for the Main Program from the list within the Schedule Queue 207.

FIG. 3 shows a third functional architecture of an Associated Digital Television Receiver (ADTVR) 300 constructed in accordance with a third preferred embodiment of the present invention. This third Associated Digital Television Receiver (ADTVR) 300 is primarily applicable where the RSVP Service icon is not embedded within the MPEG-2 video signal of a Preview Program transmitted by the broadcaster, and generally operates similar to the first Associated Digital Television Receiver (ADTVR) 100 with the exception that it generates and provides the RSVP Icon to the video display simultaneously when a Preview Program is being displayed in order to advise the viewer of the RSVP functionality.

As shown in FIG. 3, the Associated Digital Television Receiver (ADTVR) 300 includes a Channel Demodulator 301, a Transport Stream (TS) Demultiplexer 302, a Controller 303, a System and Schedule Manager (SSM) 304, a Digital Storage Device 305, Application Decoders 306, a Schedule Queue 307, and an Output Video Formatter 308.

Initially, within the third Associated Digital Television Receiver (ADTVR) 300, the Channel Demodulator 302 receives the digital television signal transmitted over the transmission channel from the digital television broadcaster, and which digital television signal is provided at input 310. The Channel Demodulator 301 extracts the channel specific bitstreams from the received digital television signal.

The Channel Demodulator 301 is configured to demodulate the signal received at input 310 based upon a channel selection command 311 sent by System and Schedule Manager 304. This channel selection command 311 is chosen based upon the user's tuning choices and selections which are input at a User Interface 312. The Channel Demodulator 301 outputs the channel specific bitstreams 313 to the TS Demultiplexer 302.

The TS Demultiplexer 302 then demultiplexes those channel specific bitstreams 313, or TS packets, coming from the Channel Demodulator 301. When the channel specific bitstreams 313 are demultiplexed by the TS Demultiplexer 302, the System and Schedule Manager 304 obtains Program Specific Information (PSI) 314 for the chosen channel specific bitstreams 313. The Program Specific Information (PSI) 314 is embedded within the TS packets 313 as tables. The System and Schedule Manager 304 coordinates the Program Specific Information (PSI) 314 of the selected channel specific bitstreams 313 with the viewer's selection's input at the User Interface 312, and receives the viewer's choices regarding program selection, request for viewing, recording, etc.

In response to the viewer's selections 312, the System and Schedule Manager 304 controls and manages the flow of the bitstreams regarding the selected programs in accordance with the user's requests and feeds packet identifications (PID) 315 to the TS Demultiplexers 302 to select the associated bitstreams of the programs that the viewer has selected.

By controlling the TS Demultiplexer 302, the System and Schedule Manager 304 obtains the Program Specific Information (PSI) 314 from the channel selected by the user 312, and which was previously input into the Channel Demodulator 301 at input 311. A specific description of the Program Specific Information (PSI) in an MPEG-2 digital television signal can be obtained from the International Standard ISO/IEC 13818-1, which is known in the art and incorporated herein by reference. International Standard ISO/IEC 13818-1 also includes an explanation of TS packetization, and reference should be made to the TS syntax defined therein.

Typical steps which may be used to get the Program Specific Information (PSI) from the Transport Stream Packets is to first find the Program Associated Table (PAT) which contains the program numbers and the Packet Identification (PID) of the associated Program Map Tables (PMT). Then, once the Program Map Tables (PMT) are obtained, the respective Packet Identifications (PID) of the elementary or packetized elementary bitstreams of the programs available in the channel can be obtained from the Program Map Tables (PMT), and utilized by the System and Schedule Manager 304, to process the bitstreams of the programs selected for viewing and/or processing.

In the third preferred embodiment of the present invention, the System and Schedule Manager 304 first obtains the Program Associated Tables (PAT) of the selected channel from the TS Demultiplexer 302, which contains the program numbers and the Packet Identification (PID) of the associated Program Map Tables (PMT). Then from the Program Map Tables (PMT) the respective Packet Identification (PID) of the elementary or packetized elementary streams of the programs available in the channel can be attained.

In the third preferred embodiment of the present invention, if the System and Schedule Manager 304 detects that the current program which has been selected for viewing contains Broadcasting Schedule Information (BSI), i.e., meaning that it is a Preview Program capable of providing the RSVP Service, then the System and Schedule Manager 304 causes the RSVP icon to be sent for display simultaneously with the Preview Program. In the third preferred embodiment, the System and Schedule Manager 304 sends control signals 315, 320, 319 to the TS Demultiplexer 302, the Controller 303, and the Output Video Formatter 308, respectively, to cause the RSVP icon, being input 331 into the Output Video Formatter 308 from a RSVP Icon storage medium 332 to be simultaneously displayed within the final video output 333.

While the RSVP icon is displaying simultaneously with the Preview Program, the viewer can easily select the associated Main Program for future viewing and/or recording. If the viewer decides to select the associated Main Program, then the viewer inputs their instructions into the System and Schedule Manager 304 through a user interface 312.

Based upon those viewer instructions, the System and Schedule Manager 304 saves the Broadcasting Schedule Information (BSI) of the associated Main Program into the Schedule Queue 307. The System and Schedule Manager 304 downloads the Broadcasting Schedule Information (BSI) being carried within the Program Specific Information (PSI) 314 from the TS Demultiplexer 302 into the Schedule Queue 307. Once the Broadcasting Schedule Information (BSI) is stored in the Schedule Queue 307, the System and Schedule Manager 304 keeps comparing the program start time downloaded from the start_time descriptor with the System Time 321.

When the broadcasting schedule time occurs for a reserved Main Program whose Broadcasting Schedule Information (BSI) is stored in the Schedule Queue 307, the System and Schedule Manager 304 sends a new signal 311 to the Channel Demodulator 301 and thereby changes the channel number instruction 311 for the Channel Demodulator 301 to the channel number for the reserved Main Program as specified in the Broadcasting Schedule Information (BSI). The System and Schedule Manager 304 then instructs the TS Demultiplexer 302 to output 316 the bitstreams of the reserved Main Program whose program number is also stored within in the Broadcasting Schedule Information (BSI) in the Schedule Queue 307.

In the third preferred embodiment of the present invention, all of the Broadcast Schedule Information (BSI) is stored in the Schedule Queue 307. However, other embodiments of the present invention are envisioned which would allow the Schedule Queue more efficiency in storage size and operation where the Schedule Queue would only store the start_time descriptor and a storage address for the remainder of the Broadcast Schedule Information (BSI), a separate storage device would hold the remaining Broadcast Schedule Information (BSI) and control instructions.

Once the bitstreams of the reserved Main Program are output 316 from the TS Demultiplexer 302, the System and Schedule Manager 304 checks to see if the viewer instructs the Associated Digital Television Receiver (ADTVR) 300 to display or record the reserved Main Program. If the viewer instructs the Associated Digital Television Receiver (ADTVR) to display the reserved Main Program, then the System and Schedule Manager 304 sends a control signal 320 to the Controller 303 so that the bitstream of the Main Program output 316 from the TS Demultiplexer 302 goes directly to the Application Decoders 306 for decoding and display output. Display output includes both decoded audio 319 and decoded video 318. The decoded video 318 is sent through the Output Video Formatter to the display for final display, however in this instance the RSVP Icon is not overlaid onto the display output.

Alternatively, if either (a) the viewer instructs the Associated Digital Television Receiver (ADTVR) to record the reserved Main Program, or (b) the viewer fails to input an instruction to view the reserved Main Program within a predetermined period of time of the broadcast schedule time, then the System and Schedule Manager 304 sends a control signal 320 to the Controller 303 so that the bitstream of the Main Program output 316 from the TS Demultiplexer 302 is written to the Digital Storage Device 305. It should be noticed that the Associated Digital Television Receiver (ADTVR) 300 of the third preferred embodiment of the invention advises the viewer that the broadcast schedule time is occurring and they must input a viewing instruction to view if they do not want the Main Program to be recorded.

Once the Main Program either finishes recording or displaying, either because the information within the end_time descriptor matches the System Time 321 or the downloaded MPEG-2 signal for the Main Program signifies that the Main Program is completed, the System and Schedule Manager 304 deletes the Broadcasting Schedule Information (BSI) for the Main Program from the list within the Schedule Queue 307.

Thereafter, if the Main Program has been previously recorded, the viewer may decide to display the previously recorded Main Program. When the viewer inputs a request to play the previously saved Main Program at the user interface 312, the System and Schedule Manager 304 of the third preferred Associated Digital Television Receiver (ADTVR) 300 instructs the Controller 303 to read 322 the saved bitstream of the Main Program from the Digital Storage Device 306 and delivers the Main Program bitstream along output 317 to the Application Decoders 306 for decoding and then for playing.

FIG. 4 shows a fourth functional architecture of an Associated Digital Television Receiver (ADTVR) 400 constructed in accordance with a fourth preferred embodiment of the present invention. This fourth Associated Digital Television Receiver (ADTVR) 400 is primarily applicable where the RSVP Service icon is not embedded within the MPEG-2 video signal of a Preview Program transmitted by the broadcaster, and generally operates similar to the third Associated Digital Television Receiver (ADTVR) 300 with the exception that it does not provide functionality for recording a Main Program for delayed viewing.

This fourth Associated Digital Television Receiver (ADTVR) 400 itself generates and provides the RSVP Icon to the video display simultaneously when a Preview Program is being displayed in order to advise the viewer of the RSVP functionality, and only provides functionality for reserved viewing of a Main Program in conjunction with the system where the RSVP Service icon is not embedded within the MPEG-2 video signal of a Preview Program transmitted by the broadcaster.

As shown in FIG. 4, the Associated Digital Television Receiver (ADTVR) 400 includes a Channel Demodulator 401, a Transport Stream (TS) Demultiplexer 402, a System and Schedule Manager (SSM) 404, Application Decoders 406, a Schedule Queue 407, and an Output Video Formatter 408.

Initially, within the fourth Associated Digital Television Receiver (ADTVR) 400, the Channel Demodulator 402 receives the digital television signal transmitted over the transmission channel from the digital television broadcaster, and which digital television signal is provided at input 410.

The Channel Demodulator 401 extracts the channel specific bitstreams from the received digital television signal 410.

The Channel Demodulator 401 is configured to demodulate the signal received at input 410 based upon a channel selection command 411 sent by System and Schedule Manager 404. This channel selection command 411 is chosen based upon the user's tuning choices and selections which are input at a User Interface 412. The Channel Demodulator 401 outputs the channel specific bitstreams 413 to the TS Demultiplexer 402.

The TS Demultiplexer 402 then demultiplexes those channel specific bitstreams 413, or TS packets, coming from the Channel Demodulator 401. When the channel specific bitstreams 413 are demultiplexed by the TS Demultiplexer 402, the System and Schedule Manager 404 obtains Program Specific Information (PSI) 414 for the chosen channel specific bitstreams 413. The Program Specific Information (PSI) 414 is embedded within the TS packets 413 as tables. The System and Schedule Manager 404 coordinates the Program Specific Information (PSI) 414 of the selected channel specific bitstreams 413 with the viewer's selection's input at the User Interface 412, and receives the viewer's choices regarding program selection, request for viewing, etc.

In response to the viewer's selections 412, the System and Schedule Manager 404 controls and manages the flow of the bitstreams regarding the selected programs in accordance with the user's requests and feeds relevant packet identifications (PID) 415 to the TS Demultiplexers 402 to select the associated bitstreams of the programs that the viewer has selected.

By controlling the TS Demultiplexer 402, the System and Schedule Manager 404 obtains the Program Specific Information (PSI) 414 from the channel selected by the user 412, and which was previously input into the Channel Demodulator 401 at input 411. A specific description of the Program Specific Information (PSI) in an MPEG-2 digital television signal can be obtained from the International Standard ISO/IEC 13818-1, which is known in the art and incorporated herein by reference. International Standard ISO/IEC 13818-1 also includes an explanation of TS packetization, and reference should be made to the TS syntax defined therein.

Typical steps which may be used to get the Program Specific Information (PSI) from the Transport Stream Packets is to first find the Program Associated Tables (PAT) which contains the program numbers and the Packet Identification (PID) of the associated Program Map Tables (PMT). Then, once the Program Map Tables (PMT) are obtained, the respective Packet Identification (PID) of the elementary or packetized elementary bitstreams of the programs available in the channel can be obtained from the Program Map Tables (PMT), and utilized by the System and Schedule Manager 404, to process the bitstreams of the programs selected for viewing and/or processing.

In the fourth preferred embodiment of the present invention, the System and Schedule Manager 404 first obtains the Program Associated Tables (PAT) of the selected channel from the TS Demultiplexer 402, which contains the program numbers and the Packet Identification (PID) of the associated Program Map Tables (PMT). Then from the Program Map Tables (PMT) the respective Packet Identification (PID) of the elementary or packetized elementary streams of the programs available in the channel can be attained.

In the fourth preferred embodiment of the present invention, if the System and Schedule Manager 404 detects that the current program which has been selected for viewing contains Broadcasting Schedule Information (BSI), i.e., meaning that it is a Preview Program capable of providing the RSVP Service, then the System and Schedule Manager 404 causes the RSVP icon to be sent for display simultaneously with the Preview Program.

In the fourth preferred embodiment, in order to simultaneously display the Preview Program and the RSVP Icon, the System and Schedule Manager 404 sends control signals 415, 419 to the TS Demultiplexer 402 and the Output Video Formatter 408, respectively, to cause the RSVP icon, being input 431 into the Output Video Formatter 408 from a RSVP Icon storage medium 432 to be simultaneously displayed within the final video output 433.

While the RSVP icon is displaying simultaneously with the Preview Program, the viewer can easily select the associated Main Program for future viewing. If the viewer decides to select the associated Main Program, then the viewer inputs their instructions into the System and Schedule Manager 404 through a user interface 412.

Based upon those viewer instructions, the System and Schedule Manager 404 saves the Broadcasting Schedule Information (BSI) of the associated Main Program into the Schedule Queue 407. The System and Schedule Manager 404 downloads the Broadcasting Schedule Information (BSI) being carried within the Program Specific Information (PSI) 414 from the TS Demultiplexer 402 into the Schedule Queue 407. Once the Broadcasting Schedule Information (BSI) is stored in the Schedule Queue 407, the System and Schedule Manager 404 keeps comparing the program start time downloaded from the start_time descriptor with the System Time 421.

When the broadcasting schedule time occurs for a reserved Main Program whose Broadcasting Schedule Information (BSI) is stored in the Schedule Queue 407, the System and Schedule Manager 404 sends a new signal 411 to the Channel Demodulator 401 and thereby changes the channel number instruction 411 for the Channel Demodulator 401 to the channel number for the reserved Main Program as specified in the Broadcasting Schedule Information (BSI). The System and Schedule Manager 404 then instructs the TS Demultiplexer 402 to output 416 the bitstreams of the reserved Main Program whose program number is also stored within in the Broadcasting Schedule Information (BSI) in the Schedule Queue 407.

In the fourth preferred embodiment of the present invention, all of the Broadcast Schedule Information (BSI) is stored in the Schedule Queue 407. However, other embodiments of the present invention are envisioned which would allow the Schedule Queue more efficiency in storage size and operation where the Schedule Queue would only store the start_time descriptor and a storage address for the remainder of the Broadcast Schedule Information (BSI), a separate storage device would hold the remaining Broadcast Schedule Information (BSI) and control instructions.

Once the bitstreams of the reserved Main Program are output 416 from the TS Demultiplexer 402, the output 416 from the TS Demultiplexer 402 goes directly to the Application Decoders 406 for decoding and display output. Display output includes both decoded audio 419 and decoded video 418. The decoded video 418 is sent through the Output Video Formatter to the display for final display, however in this instance the RSVP Icon is not overlaid onto the display output.

Once the Main Program either finishes recording or displaying, either because the information within the end_time descriptor matches the System Time 421 or the downloaded MPEG-2 signal for the Main Program signifies that the Main Program is completed, the System and Schedule Manager 404 deletes the Broadcasting Schedule Information (BSI) for the Main Program from the list within the Schedule Queue 407.

Accordingly, it will be understood that the preferred embodiments of the present invention have been disclosed by way of example only, and that other modifications and alterations may occur to those skilled in the art without departing from the scope of the appended claims. Those skilled in the art will appreciate the various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A receiver for a digital video service network, the receiver comprising:
   means for receiving a digital television signal broadcast by a broadcaster over a transmission channel, the digital television signal including a Preview Program for a Main Program and Broadcasting Schedule Information for the Main Program;
   means for decoding the digital television signal;
   means for providing an output signal reflective of the Preview Program for display; and
   means for selecting an item of the Main Program corresponding to a current segment of the Preview Program from the Broadcasting Schedule Information based on user instructions while the user is watching the current segment of the Preview Program,
   wherein when the Preview Program is being broadcast over the transmission channel, the Broadcast Schedule Information is broadcast along with the Preview Program in the digital television signal such that the Broadcasting Schedule Information is received by said means for receiving a digital television signal simultaneously with the Preview Program,
   wherein the means for selecting the Main Program comprises an icon simultaneously displayed with the current segment of the Preview Program indicating to the user a capability of receiving the user instructions to reserve the corresponding item of the Main Program.

2. The receiver of claim 1, further comprising means for demodulating the received digital television signal and extracting bit streams describing the digital television signal.

3. The receiver of claim 1, wherein the means for decoding the digital television signal comprises a Transport Stream (TS) demultiplexer for generating a signal corresponding to the Preview Program.

4. The receiver of claim 3, wherein the TS demultiplexer is also configured to output the Broadcasting Schedule Information.

5. The receiver of claim 3, further comprising means for downloading the Broadcasting Schedule Information while the current segment of the Preview Program is being decoded and displayed, wherein the Broadcasting Schedule Information includes information describing the corresponding item of the Main Program, including a channel number and a start time.

6. The receiver of claim 5, further comprising a Schedule Queue, the Schedule Queue receiving at least the start time of the Broadcasting Schedule Information, the start time being compared with a system clock to determine when to have control signals sent to instruct the receiver to process the selected item of the Main Program.

7. The receiver of claim 6, further comprising means for notifying the user that the start time is approaching and requesting an instruction as to whether the user desires that the selected item of the Main Program be recorded or displayed.

8. The receiver of claim 7, wherein the means for notifying the user provides an instruction to record if the viewef user does not input any instruction within a predetermined time.

9. The receiver of claim 6, further comprising means for comparing the start time with a system clock, and then sending control signals to instruct the receiver to display the selected item of the Main Program at the start time.

10. The receiver of claim 1, further comprising a System and Schedule Manager for controlling the means for decoding the digital television signal, the System and Schedule Manager further directing a data stream flow ef-data from the digital television signal.

11. The receiver of claim 1, further comprising a Digital Storage Device for receiving, storing and replaying data corresponding the Main Program, the Main Program being related to the Preview Program and the Main Program being described by the Broadcasting Schedule Information.

12. The receiver of claim 1, further comprising Application decoders for decoding audio and video coded bit streams of the Preview Program and the Main Program, the Application decoders sending an Audio output signal for transducing into sound and a decoded video signal for processing and display on a digital television.

13. The receiver of claim 12, further comprising means for generating the icon to overlay the video output of the decoded video signal during display on the digital television.

14. The receiver of claim 1, wherein the Broadcasting Schedule Information is delivered to the means for receiving a digital television signal simultaneously with the Preview Program.

15. A method for providing MPEG-2 digital television signals, the method comprising the steps of:
   providing a Preview Program, the Preview Program relating to a Main Program;
   providing Broadcasting Schedule Information relating to the Main Program;
   coding the Preview Program into an MPEG-2 signal;
   embedding the Broadcasting Schedule Information into the MPEG-2 signal such that the Broadcasting Schedule Information will be received by a digital television receiver while the Preview Program is being decoded by the digital television receiver; and
   selecting an item of the Main Program corresponding to a current segment of the Preview Program from the Broadcasting Schedule Information based on user instructions when an icon is simultaneously displayed with the current segment of the Preview Program indicating to the user a capability of reserving the item of the Main Program corresponding to the current segment of the Preview Program,
   wherein the Broadcast Schedule Information is broadcast along with the Preview Program and received by said digital television receiver simultaneously with the Preview Program.

16. The method of claim 15, further comprising the step of coding the icon into the MPEG-2 signal.

17. An MPEG-2 digital television signal, comprising:
   a Preview Program coded within the MPEG-2 signal, the Preview Program relating to a Main Program;
   Broadcasting Schedule Information embedded within the MPEG-2 signal, the Broadcasting Schedule Information relating to the Main Program; and
   the Broadcasting Schedule Information being embedded into the MPEG-2 signal such that the Broadcasting Schedule Information will be received by a digital television receiver while the Preview Program is being decoded by the digital television receiver,
   wherein the Broadcast Schedule Information is broadcast along with the Preview Program and recieved simultaneously with the Preview Program; and
   wherein an item of the Main Program is selectable from the Broadcasting Schedule Information based on user instructions when the user sees an icon simultaneously displayed with a current segment of the Preview Program corresponding to the item of the Main Program.

18. The MPEG-2 signal of claim 17, further comprising the icon coded into the MPEG-2 signal, the icon informing the viewer that the MPEG-2 signal includes both the Preview Program and the Broadcasting Schedule Information.

19. A method of displaying an MPEG-2 digital television signal including a Preview Program and Broadcasting Schedule Information related to a Main Program, comprising the steps of:
   displaying the Preview Program coded within the MPEG-2 signal, the Preview Program corresponding to an related item in the Main Program of choice for the viewer; and
   receiving ordering information embedded within the MPEG-2 signal simultaneously with the display of a current segment of the Preview Program, the ordering information relating to the item of choice, and the ordering information allowing a viewer to select the item based on an icon simultaneously displayed with the Preview Program,
   wherein the Broadcast Schedule Information is broadcast along with the Preview Program and received simultaneously with the Preview Program.

20. The method of claim 19, further comprising the step of providing the icon to a viewer to inform the viewer that they are receiving both the Preview Program and the ordering information.

* * * * *